No. 679,487. Patented July 30, 1901.
W. I. TUTTLE.
TESTING APPARATUS.
(Application filed Mar. 29, 1901.)
(No Model.) 2 Sheets—Sheet 1.
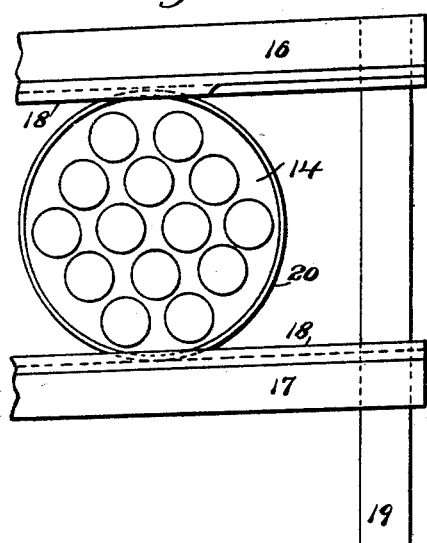
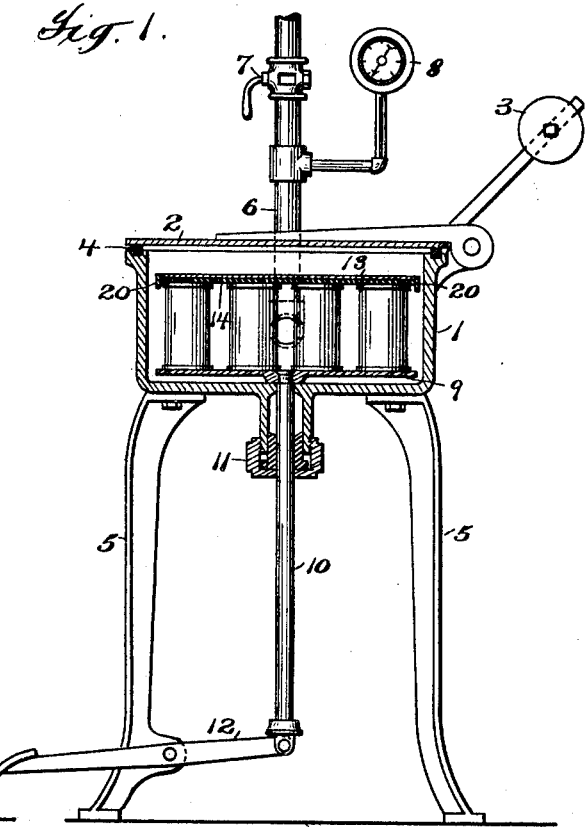

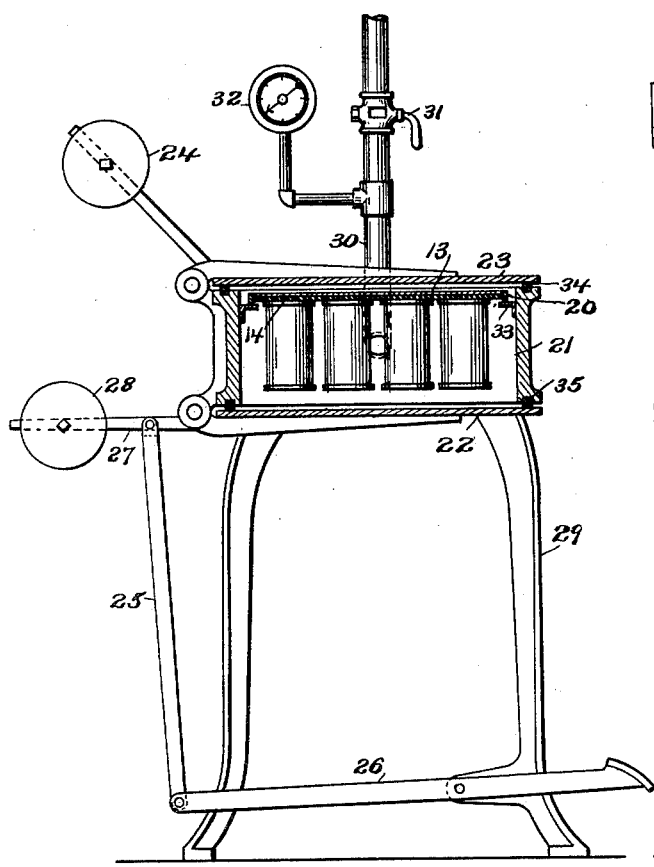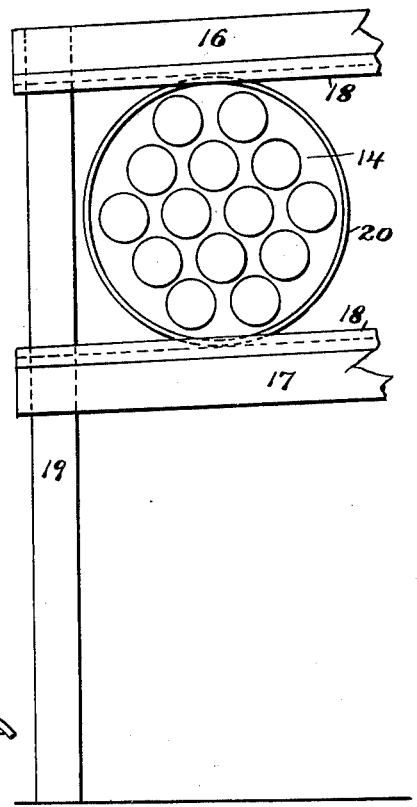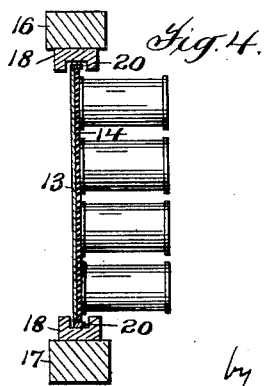

UNITED STATES PATENT OFFICE.

WASHINGTON I. TUTTLE, OF BALTIMORE, MARYLAND, ASSIGNOR TO THE AMERICAN TOBACCO COMPANY, OF NEW YORK, N. Y.

TESTING APPARATUS.

SPECIFICATION forming part of Letters Patent No. 679,487, dated July 30, 1901.

Application filed March 29, 1901. Serial No. 53,389. (No model.)

*To all whom it may concern:*

Be it known that I, WASHINGTON I. TUTTLE, a citizen of the United States, residing at Baltimore city, in the State of Maryland, have invented certain new and useful Improvements in Testing Apparatus, fully described and represented in the following specification and the accompanying drawings, forming a part of the same.

This invention relates to certain improvements in an apparatus for testing cans or other similar receptacles.

Cans or other similar receptacles are now ordinarily tested by plunging them into a tank of water after they have been filled with air under pressure. The air will escape from the imperfect cans and the existence of imperfections will be indicated by bubbles in the water. This operation is slow, since the apparatus usually employed does not permit of handling more than one can at a time, and is, furthermore, unsatisfactory, because the leaks in the cans are sometimes so small that sufficient air will not escape therefrom to form bubbles in the time during which it is practicable to keep the cans or receptacles in the water. It has further been proposed to test cans by constructing a rotating wheel or carrier which is provided on its rim with a series of elastic pads, said pads being perforated by nipples, from which lead pipes which are successively connected to an exhaust apparatus. As the wheel rotates a can is placed over a nipple and the pipe leading from said nipple is then brought into connection with the exhaust apparatus, so that the air may be exhausted from the can. By a proper valve the pipe is then closed, so that the vacuum will be maintained in the can. If the can is perfect, it will be held against the pad by atmospheric pressure. Should, however, the can be imperfect, the air will enter it and the can will become detached from the pad. If the can remains attached to the pad when the wheel has completed a rotation, a valve in the pipe leading to the nipple is turned, so as to permit the air to enter the can and detach it from the pad. This apparatus is also unsatisfactory, since to properly test the cans they must be allowed to remain subject to the atmospheric pressure for some little time. The rotation of the wheel must therefore be slow and the capacity of the apparatus is consequently limited. Furthermore, this apparatus is expensive and complicated to construct, and it has not therefore gone into extensive use.

It is the object of this invention to produce an improved apparatus for testing cans which will be simple and cheap to construct, which will be efficient in operation, and by which large numbers of cans may be efficiently tested.

With this and other objects in view the invention consists in certain constructions and in certain parts, improvements, and combinations, as will be hereinafter fully described and then specifically pointed out in the claims hereunto appended.

Referring to the drawings, which form a part of this specification, and in which like characters of reference indicate the same parts, Figure 1 is a view of an exhaust or vacuum chamber which forms a part of the improved apparatus. Fig. 2 illustrates one end of a runway which also may form a part of the apparatus. Fig. 3 is a view of the other end of the runway. Fig. 4 is a sectional view of the same and one form of sealing-plate employed. Fig. 5 is a view of another form of exhaust or vacuum chamber which also forms a part of the apparatus. Fig. 6 illustrates a modified construction.

Referring to the drawings, 1 indicates a vacuum-chamber which is preferably provided with a hinged cover 2, having secured thereto a counterbalancing-weight 3, which enables the cover to be more easily manipulated. A gasket 4 is or may be provided between the chamber and the cover, and the chamber will preferably be mounted on suitable legs 5. A pipe 6 is tapped into the chamber, said pipe leading to any suitable form of exhaust mechanism—as, for instance, a fan F, such as shown in Fig. 6. A controlling-valve 7 is located in the pipe 6, and a gage or indicator 8 will preferably be attached thereto, which serves to indicate the degree of vacuum which the exhaust apparatus produces in the chamber.

The improved testing apparatus further includes a temporary sealing-plate—that is, a plate which is used to temporarily seal the receptacles while they are being tested—this plate being separate from the exhaust-chambers, so that it can be removed from them, and thus adapted to be used with each of them. This sealing-plate may be formed of any suitable material and may be of any suitable configuration. Preferably, however, it will be circular in form and will be made of metal. When made of metal, it will have secured thereto a suitable elastic surface 14, which may be made of any desired material which is suitable for this purpose—as, for instance, soft rubber. The plate 13 is also preferably provided with a flange 20, the purpose of which will hereinafter appear. The plate will preferably be made large enough to cover a plurality of cans or similar receptacles.

The apparatus is particularly adapted for simultaneously testing a number of receptacles, though it might be used for testing single receptacles. In using it, therefore, a plurality of cans is placed in the chamber 1, the usual openings in the cans being covered by the sealing-plate, the elastic face of the plate being of course in contact with the cans. The cover of the chamber is now closed and the valve 7 is turned so as to permit the fan or other exhaust apparatus to create a vacuum in the chamber which, of course, also exhausts the air from the interior of the cans. When this has been accomplished, the cans and plate are subjected to gaseous and preferably atmospheric pressure in order to attach the cans to the plate. This is preferably accomplished by forming the controlling-valve 7 so that when it is turned to cut off the exhaust apparatus it will permit a sudden inrush of air into the chamber 1.

In order to detect imperfections in the cans, they will be allowed to stand under gaseous pressure for some minutes. While this might be done by leaving the cans in the chamber 1, they will preferably be removed therefrom. This may be effected in any suitable manner; but the chamber will preferably be provided with a lifter-plate 9, which is located, as shown in Fig. 1, near the bottom of the chamber. This plate may be actuated in any suitable manner. Preferably, however, there will be provided a movable lifter-rod 10, which passes through a suitable stuffing-box 11, said rod being actuated by means of a treadle 12 or by any other suitable means. When the cover of the chamber 1 is raised, the operator steps on the treadle 12 and lifts the cans and plate, so that the plate can be readily seized and removed, together with the cans, from the chamber. After removing the cans from the chamber they will be allowed to stand under atmospheric pressure for a sufficient length of time to permit the air to enter any imperfect cans, and thus become detached from the plate. This may be accomplished in any suitable manner. Preferably, however, there will be provided a runway which may consist of upper and lower bars 16 and 17, said bars being provided with grooved tracks 18 and being supported on standards 19. The circular sealing-plates are placed in the runway so that their flanges 20 engage the tracks, and the runway is preferably slightly inclined, so that the sealing-plate carrying the cans will roll gently down the same. After the cans have been subjected to atmospheric pressure for a sufficient length of time to thoroughly test them the sound cans are removed from the plate by equalizing the pressure inside and outside the cans. This may be accomplished in any suitable manner. Preferably, however, it will be accomplished by placing the cans and plate in a second vacuum-chamber, the air being exhausted from this chamber in order to equalize the pressure inside and outside the cans, so that they may become detached from the plate. This second vacuum-chamber may be constructed in any suitable manner and located at any desired point. Preferably, however, it will be arranged at the end of the runway before referred to and will consist of a suitable chamber 21, which is or may be supported on legs 29. This chamber has a suitable hinged lid or cover 23, to which is secured a counterbalance 24 to aid in manipulating the same, and is also provided with a bottom 22, which is preferably hinged for a purpose to be hereinafter stated. Suitable gaskets 34 and 35 are or may be employed to form tight joints between the chamber and its lid or cover and between the chamber and its bottom. The chamber 21 is preferably provided with means for supporting the sealing-plate and cans above its bottom, so that when the air is exhausted therefrom the can can drop from the plate to the bottom of the chamber. The supporting means employed may be of any suitable construction, but will preferably consist of a flange 33, arranged as shown in Fig. 5. The vacuum in the chamber may be produced by means of a pipe 30, which is tapped into the side of the chamber and is provided with a suitable controlling-valve 31, said valve being preferably constructed so that when in one position it will permit the vacuum apparatus to act upon the chamber through the pipe 30 and when in another position allow the air to enter the chamber. A suitable gage 32 is or may be employed to denote the degree of vacuum in the chamber 21, said gage being connected to the pipe 30. As before stated, the sealing-plates and their attached cans are allowed to remain in the runway a sufficient length of time to allow the air to enter any imperfect can and detach it from the plate. When the plates have remained in the runway for a suitable length of time, each plate, together with its attached cans, is removed therefrom and placed on the flange 33 in the chamber 21. The valve 31 is now turned so as to allow the vacuum apparatus to act on the chamber, and as soon as a sufficient vacuum has been produced, so that the pressure on the outside of the cans equals or is less than that on the inside, the cans will drop from the plate to the bottom of the chamber. The air is now allowed to reënter the chamber and the cans and plate are removed.

While the cans may be removed from the chamber in any suitable manner, the bottom, as heretofore stated, is made movable for this purpose, so that when it is swung down the cans will slide from the chamber. The movable bottom 22 may be operated through any suitable means. Preferably, however, it is provided with an operating-arm 27, which may carry a counterbalance 28, which operates to return the movable bottom and hold it in closed position. To the arm 27 is attached a link 25, which in turn is connected to a suitable actuating device, such as a treadle 26.

The operation of the apparatus so far described will be clear from the foregoing description. It may be remarked, however, that the runway may be made long enough so that the time of transit from one end to the other will be sufficient to test the cans, in which case two operators may be conveniently employed, one to operate the apparatus shown in Fig. 1 and the other to operate the apparatus shown in Fig. 5. If desired, however, the runway may be made shorter and act as a supporting-rack. In this case a single operator may operate the apparatus shown in Fig. 1 until the rack is filled and then operate the apparatus shown in Fig. 5 to release the cans. While the runway is a desirable feature of the invention, it is to be understood that it may be dispensed with, if desired, and the cans transported from one vacuum-chamber to the other in any suitable manner.

In Fig. 6 is shown a modified form of apparatus. In this construction the sealing-plate 13 is provided with a series of perforations which extend through the elastic surface 14. These perforations are closed by valves 40, said valves being supported by suitable bonnets 41 and having their stems surrounded by springs 42. The chamber 1 is arranged in this construction to support the sealing-plate instead of containing it, the cover 2 being done away with and the plate resting upon the gasket 4. In this form of the construction the plate is laid on the chamber with the sealing-surface uppermost and the cans are placed on this surface, as shown in Fig. 6. The pipe 6 is shown as tapped into the bottom of the chamber. With this construction, when the fan has exhausted the air from the chamber the valves 40 will be drawn back against the force of the springs 42, so that the air is exhausted from the interior of the cans. After the air has been thus exhausted from the cans the valve 7 is turned so as to permit the air to rush into the chamber 1, the pressure of the air causing the valves to be forced against their seats.

The plate 13 is now lifted from the chamber and allowed to stand until the air has entered any imperfect can and detached it from the plate. The runway may be employed with this form of plate, if desired, and any suitable means may be used for operating the valves, so that the air may be admitted to the interior of the sound cans in order to detach them from the plate.

While the modified form of apparatus just described is a practicable one and is within the scope of the invention, broadly considered, it is considerably more expensive to construct than the form first described because of the number of valves necessarily employed and the necessity of so constructing these valves that they will close tightly against their seats.

While the constructions which have been described are effective, it is to be understood that the invention is not to be confined to the specific details thereof, as wide changes and variations may be made in said constructions. It is to be furthermore understood that parts of the apparatus may be used independently of other parts and that such independent use is contemplated.

What is claimed is—

1. In a testing apparatus an exhaust mechanism, a temporary sealing-plate separate from said mechanism but adapted to be placed in coactive relation therewith, said mechanism operating to exhaust the air from a receptacle or receptacles covered by said plate, whereby the plate with a sound receptacle or receptacles held thereon by atmospheric pressure may be bodily removed from the exhaust mechanism, substantially as described.

2. In a testing apparatus an exhaust mechanism, a temporary sealing-plate separate from said mechanism but adapted to be placed in coactive relation therewith, said mechanism operating to exhaust the air from a receptacle or receptacles covered by said plate, whereby the plate with a sound receptacle or receptacles held thereon by atmospheric pressure may be bodily removed from the exhaust mechanism, and means for equalizing the pressure inside and outside the receptacle or receptacles whereby they are detached from the plate, substantially as described.

3. In a testing apparatus an exhaust mechanism including a vacuum-chamber and a temporary sealing-plate which is separate from said chamber but adapted to be placed in coactive relation therewith, said mechanism operating to exhaust the air from a receptacle or receptacles closed by said plate, whereby the plate with a sound receptacle or receptacles held thereon by atmospheric pressure may be removed from the chamber, substantially as described.

4. In a testing apparatus an exhaust mechanism including a vacuum-chamber and a temporary sealing-plate which is separate from said chamber but adapted to be placed in coactive relation therewith, said mechanism operating to exhaust the air from a receptacle or receptacles closed by said plate, whereby the plate with a sound receptacle or receptacles held thereon by atmospheric pressure may be removed from the chamber, and means for detaching the receptacle or receptacles from the plate by equalizing the pressure inside and outside the receptacle or receptacles, substantially as described.

5. In a testing apparatus, a temporary sealing-plate, a vacuum-chamber adapted to contain said plate and a plurality of receptacles to be closed by the plate, and means for exhausting and admitting air from and to said chamber, substantially as described.

6. In a testing apparatus, an exhaust mechanism, a temporary sealing-plate separate from said mechanism but adapted to be placed in coactive relation therewith, said mechanism operating to exhaust the air from a receptacle or receptacles closed by said plate, and a second exhaust mechanism with which the sealing-plate is adapted to coact to release the receptacles from the plate, whereby the plate may be subjected to the action of one exhaust mechanism to exhaust the air from the cans to test them and to the action of the other exhaust mechanism to release them from the plate, substantially as described.

7. In a testing apparatus for cans or similar receptacles, a vacuum-chamber, means for exhausting and admitting air from and to said chamber, a second vacuum-chamber, means for exhausting and admitting air from and to said chamber, and a temporary sealing-plate adapted to coact with either chamber, substantially as described.

8. In an apparatus for testing cans or similar receptacles, a temporary sealing-plate constructed to close a plurality of receptacles, a vacuum-chamber constructed to contain said plate and receptacles, means for exhausting and admitting air from and to said chamber, a second vacuum-chamber also adapted to contain said plate and receptacles, and means for exhausting and admitting air to and from said chamber, substantially as described.

9. In an apparatus for testing cans or similar receptacles, an exhaust mechanism, a second exhaust mechanism, a temporary sealing-plate constructed to coact with either mechanism, and means for conveying the plate on edge from one mechanism to another, substantially as described.

10. In an apparatus for testing cans or similar receptacles, a vacuum-chamber, a second vacuum-chamber, a temporary sealing-plate constructed to be placed in either chamber, and means for conveying the plate on edge from one chamber to the other, substantially as described.

11. In an apparatus for testing cans or similar receptacles, a temporary sealing-plate having an elastic sealing-surface, said plate being separate from the rest of the apparatus but being adapted to be used in coactive relation therewith, substantially as described.

12. In an apparatus for testing cans or similar receptacles, a temporary sealing-plate having an elastic sealing-surface, said plate being capacitated to cover a plurality of receptacles and being separate from the rest of the apparatus but adapted to be used in coactive relation therewith, substantially as described.

13. In an apparatus for testing cans or similar receptacles, a temporary sealing-plate having an unbroken elastic sealing-surface, said plate being separate from the rest of the apparatus but adapted to be used in coactive relation therewith, substantially as described.

14. In an apparatus for testing cans or similar receptacles, a temporary sealing-plate capacitated to cover a plurality of receptacles, said plate having an unbroken elastic sealing-surface and being separate from the rest of the apparatus but adapted to be used in coactive relation therewith, substantially as described.

15. In an apparatus for testing cans or similar receptacles, a temporary sealing-plate having an elastic sealing-surface, said plate being circular in form and separate from the rest of the apparatus but adapted to be used in coactive relation therewith, substantially as described.

16. In an apparatus for testing cans or similar receptacles, a circular temporary sealing-plate, said plate having an unbroken elastic sealing-surface and being separate from the rest of the apparatus but adapted to be used in coactive relation therewith, substantially as described.

17. In an apparatus for testing cans or similar receptacles, a sealing-plate having a circular unbroken elastic sealing-surface, said plate being capacitated to cover a plurality of receptacles and being separate from the rest of the apparatus but adapted to be used in coactive relation therewith, substantially as described.

18. In an apparatus for testing cans or similar receptacles, a vacuum-chamber, said chamber being provided with means for supporting a cover-plate and a receptacle or receptacles attached thereto above the bottom of the chamber, substantially as described.

19. In an apparatus for use in testing cans or similar receptacles, a vacuum-chamber having a movable top and a movable bottom, substantially as described.

20. In an apparatus for use in testing cans or similar receptacles, a vacuum-chamber having a movable top and a movable bottom, and means for supporting a sealing-plate and a receptacle or receptacles attached thereto above the bottom, substantially as described.

21. In an apparatus for testing cans or similar receptacles, an exhaust mechanism, a sealing-plate separate from said mechanism but adapted to be placed in coactive relation therewith, said mechanism operating to exhaust the air from a receptacle or receptacles closed by the plate, a mechanism for detaching the sound receptacle or receptacles from the plate by equalizing the pressure within and without the receptacle or receptacles, and means whereby the sealing-plate may be transferred from the exhaust mechanism to the detaching mechanism, substantially as described.

22. In an apparatus for testing cans or similar receptacles, an exhaust mechanism, a sealing-plate separate from said mechanism but adapted to be placed in coactive relation therewith, said mechanism operating to exhaust the air from a receptacle or receptacles closed by the plate, a mechanism for detaching the sound receptacle or receptacles from the plate by equalizing the pressure within and without the receptacle or receptacles, and means whereby the sealing-plate may be transferred on edge from the exhaust mechanism to the detaching mechanism, substantially as described.

23. In an apparatus for testing cans or similar receptacles, a sealing-plate, a vacuum-chamber, adapted to contain said plate and a receptacle or receptacles, a second vacuum-chamber also adapted to contain the plate and a receptacle or receptacles, and means whereby the plate may be transferred from one receptacle to the other, substantially as described.

24. In an apparatus for testing cans or similar receptacles, an exhaust mechanism, a circular sealing-plate adapted to seal a plurality of receptacles, a detaching mechanism for the sound cans, and a runway between the two mechanisms, substantially as described.

25. In an apparatus for testing cans or similar receptacles, a circular sealing-plate adapted to seal a plurality of cans or similar receptacles, an exhaust mechanism adapted to contain the plate and receptacles, a second exhaust mechanism also adapted to contain the plate and the receptacles, and a runway between the two exhaust mechanisms, substantially as described.

26. In an apparatus for testing cans or similar receptacles, a circular sealing-plate adapted to seal a plurality of receptacles, a vacuum-chamber adapted to contain the plate and receptacles, a second vacuum-chamber adapted to contain the plate and receptacles, said chamber having means for supporting the plate above its bottom and having a movable bottom and top, and a runway between the two chambers, substantially as described.

In testimony whereof I have hereunto set my hand in the presence of two subscribing witnesses.

WASHINGTON I. TUTTLE.

Witnesses:
DANIEL AMMER,
FRANK A. CRIST.